United States Patent [19]

Todo et al.

[11] Patent Number: 4,909,871

[45] Date of Patent: Mar. 20, 1990

[54] PROCESS FOR PRODUCING INFORMATION RECORDING DISCS

[75] Inventors: Akira Todo; Toshio Kimura; Takeshi Minoda; Masayoshi Kurisu, all of Ichihara, Japan

[73] Assignee: Mitsui Petrochemical Industries, Ltd., Tokyo, Japan

[21] Appl. No.: 224,682

[22] Filed: Jul. 27, 1988

[30] Foreign Application Priority Data

Jul. 27, 1987 [JP] Japan .................. 62-187249

[51] Int. Cl.⁴ .................. B29C 65/08; G11B 3/70
[52] U.S. Cl. .................. 156/73.1; 156/292; 156/300; 156/580.2; 346/135.1; 346/137; 369/286
[58] Field of Search .......... 156/73.1, 580.1, 580.2, 156/292, 300; 264/23; 360/135; 369/286; 346/135.1, 137

[56] References Cited

U.S. PATENT DOCUMENTS 4,564,932  1/1986  Langé ........................ 156/73.1
4,834,819  5/1989  Todo et al. .................. 156/73.1

FOREIGN PATENT DOCUMENTS 62-173234  7/1987  Japan ...................... 156/73.1

Primary Examiner—Michael Wityshyn
Attorney, Agent, or Firm—Sherman & Shalloway

[57] ABSTRACT

A process for producing an information recording disc of an air sandwich structure by ultrasonic welding two disc substrates, at least one of which has a recording medium containing layer, to each other through outer and inner peripheral spacers lying therebetween, which process is characterized in that the outer peripheral spacer is first welded to the disc substrate on one side, the disc substrate on the other side is then superposed through the inner peripheral spacer on said outer peripheral spacer-welded disc substrate turned inside out, and said outer peripheral spacer and disc substrate on the other side, and said inner peripheral spacer and disc substrates on both sides are ultrasonic welded together simultaneously.

7 Claims, 3 Drawing Sheets

PROCESS FOR PRODUCING INFORMATION RECORDING DISCS

FIELD OF THE INVENTION

This invention relates to processes for producing information recording discs of an air sandwich structure by ultrasonic welding, which information recording discs are useful, for example, as optical discs.

BACKGROUND OF THE INVENTION

There has been proposed a process for producing information recording discs of an air sandwich structure made of plastics to perform storing and reading of information by converging rays of light such as laser beam and the like on recording medium containing layers, which process comprises subjecting two disc substrates through outer and inner peripheral spacers lying therebetween to ultrasonic welding (e.g. Japanese Patent Laid-Open Publn. No. 103537/1985).

The proposed process is intended to laminate two disc substrates to each other, wherein outer and inner peripheral spacers both having projections on both surfaces thereof are laid between said two disc substrates, ultrasonic wave vibration emanated from an ultrasonic welding machine is applied through said two disc substrates to said outer and inner peripheral spacers, and the projections of said outer and inner peripheral spacers are softened, thereby fusion bonding said two spacers to said disc substrates at once. This process has such advantages that the process is simple and the rate of production obtained is high in this joining process.

In the prior art process as referred to above, however, there were involved such problems that shear in positioning of disc substrates and outer and inner peripheral spacers tends to occur when ultrasonic wave vibration is transmitted thereto, particularly because of its marked deformation of elastic after-effect, the outer peripheral spacer is liable to squeeze out from or enter inside the peripheral portion of disc substrates, and the positioning for obtaining a laminated disc having fusion bonded the spacers to the positions becomes difficult and, at the same time, even when the spacers have been fusion bonded to the predetermined positions, warp occurs on the disc surface and no information recording disc having an angle of warp in conformity to the standard specification (within 5 mrad according to ISO) is obtained.

OBJECT OF THE INVENTION

The present invention is intended to solve such problems as mentioned above, and an object of hte invention is to provide processes for producing information recording discs, by which a lamination process of disc substrates and spacers can be performed without causing shear in positioning of the spacers, and information recording discs comprising laminated discs which are found to be favorable from the standpoint of warp can be obtained.

SUMMARY OF THE INVENTION

The present invention is directed to a process for producing an information recording disc of an air sandwich structure by ultrasonic welding two disc substrates, at least one of which has a recording medium containing layer, to each other through outer and inner peripheral spacers lying therebetween, which process is characterized in that the outer peripheral spacer is first welded to the disc substrate on one side, the disc substrate on the other side is then superposed through the inner peripheral spacer on said outer peripheral spacer-welded disc substrate which is turned inside out, and said outer peripheral spacer and said disc substrate on the other side, and said inner peripheral spacer and disc substrates on both sides are ultrasonically welded together simultaneously.

Figure 1:
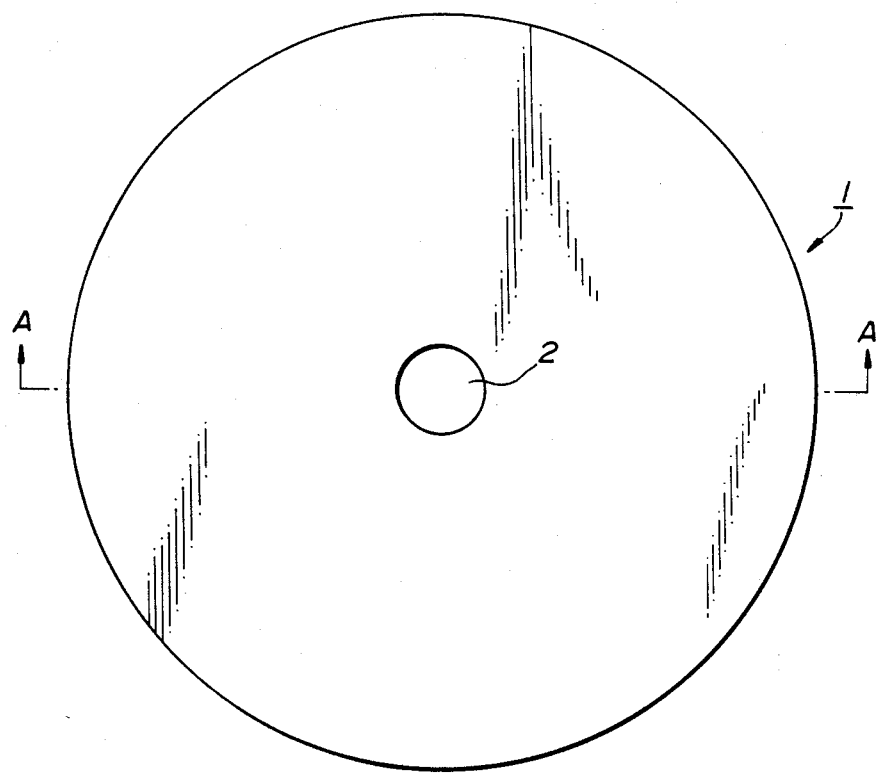
FIG. 1 is a plan view of the information recording disc of the present invention.

In the figures mentioned above, the same reference numerals represent the same or corresponding portions, wherein 1 is an information recording disc, 3a and 3b are disc substrates, 4a and 4b are recording medium containing layers, respectively, 5 is an outer peripheral spacer, 6 is an inner peripheral spacer, 7 is a projection, 8 is a welded portion, 11 is an anvil, and 14 is a horn.

DETAILED DESCRIPTION OF THE INVENTION

Materials used for forming the disc substrate, outer peripheral spacer and inner peripheral spacer are thermoplastic such as polycarbonates, polymethyl methacrylates and polyolefins. Preferably useful resins are copolymers of ethylene and cycloolefins represented by the following general formula [I] or [II]. Preferred copolymers are those which contain 40–85 mol %, preferably 50–80 mol % of ethylene. Particularly preferred resins for forming the disc substrate include, for example, cycloolefin type random copolymer compositions formed from components:

(A) a cycloolefin type random copolymer comprising an ethylene component and a cycloolefin component derived from a cycloolefin represented by the following general formula [I] or [II], said copolymer having an intrinsic viscosity [$\eta$] of 0.05–10 dl/g as measured in decalin at 135° C. and a softening temperature (TMA) of at least 70° C., and (B) a cycloolefin type random copolymer comprising an ethylene component and a cycloolefin component derived from a cycloolefin represented by the following general formula [I] or [II], said copolymer having an intrinsic viscosity [$\eta$] of 0.01–5 dl/g as measured in decalin at 135° C. and a softening temperature (TMA) of less than 70° C., the weight ratio of said component (A)/component (B) being 100/0.1 to 100/10. Preferably, the component (A) contains 40–80 mol %, preferably 50–75 mol % of ethylene, and the component (B) contains 60-98 mol %, preferably 60-95 mol % of ethylene.

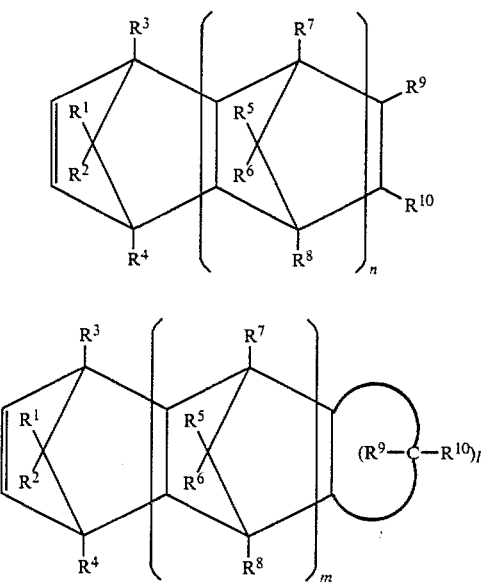

wherein n and m are each zero or a positive integer, l is an integer or 3 or more, and $R^1$ to $R^{10}$ each represent hydrogen atom, halogen atom or hydrocarbon radical.

Of the resins illustrated above, those which are used for forming the disc substrates are preferably transparent. The resins used for forming the outer peripheral spacer are preferably those incorporated with 0.01-5% by weight of inorganic particles such as titanium oxide and silica having a particle diameter of less than 200 μm. The resins used for forming the inner peripheral spacer may be those which are transparent or those which have been incorporated with fillers.

The disc substrate is molded into the form of a transparent disc. The outer peripheral spacer is molded into the form of a ring, and the inner peripheral spacer is molded into the form of a disc, and both spacers have projections formed on both surfaces thereof. It is desirable that the projection has a tapering shape, and that a plurality of projections of this shape are not formed so as to be arranged annularly and continuously, but they are formed so as to be arranged annularly but discontinuously.

The term information recording disc as referred to in the present invention is intended to include all the media which record information on recording medium containing layers thereof, such as optical discs and flexible optical discs.

In the process for producing information recording discs of the present invention, the disc substrate on one side is first superposed on the outer peripheral spacer and they are supersonically welded together, the disc substrate on the other side is then superposed through the inner peripheral spacer on said outer peripheral spacer-welded disc substrate turned inside out, and said outer peripheral spacer and said disc substrate on the other side, and said inner peripheral spacer and said disc substrates on both sides are all welded and laminated together from one direction simultaneously, whereby the desired information recording discs are produced.

EFFECT OF THE INVENTION

In the processes for the production of the information recording discs of the present invention, because the outer peripheral spacer is welded in the first stage to the disc substrate on one side, said outer peripheral spacer being liable to subject to shear in positioning, the positioning as desired becomes easy, and the shear in positioning at the time of ultrasonic welding is inhibited. Because all other unwelded parts are welded together at once at a state where the outer peripheral spacer has been welded to the disc substrate on one side, residual strain becomes less and hence the information recording discs excellent in warpage characteristics are obtained.

EMBODIMENT OF THE INVENTION

Figure 6:
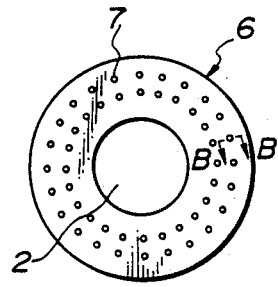
FIGS. 6 to 8 are plan views showing separate inner peripheral spacers, respectively.
Figure 7:
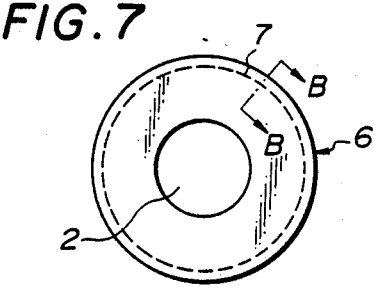
Figure 8:
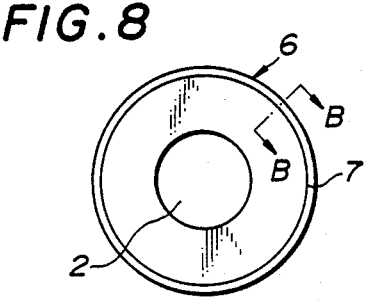
Figure 9:
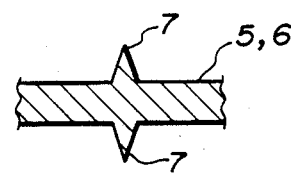
FIG. 9 is a sectional view at B—B of the spacers shown in FIGS. 3 to 8, respectively.
Figure 10:
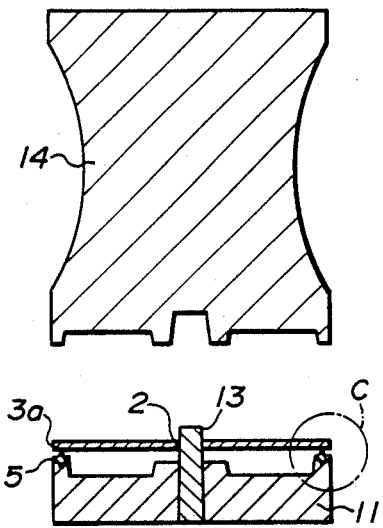
FIGS. 10 and 11 are sectional views showing the states relative to a disc substrate and outer peripheral spacer, and to disc substrates and outer and inner peripheral spacers, under which they are welded together.
Figure 11:
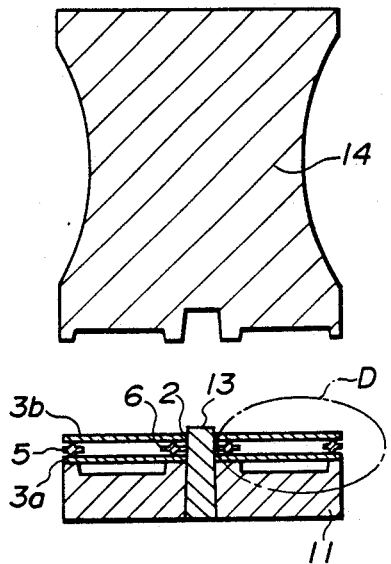
Figure 12:
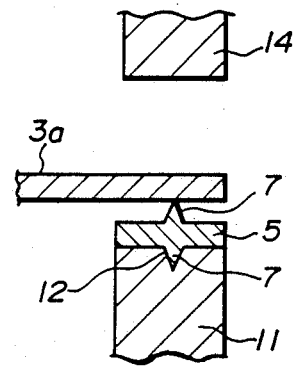
FIG. 12 is an enlarged view showing portion C of FIG. 10.
Figure 13:
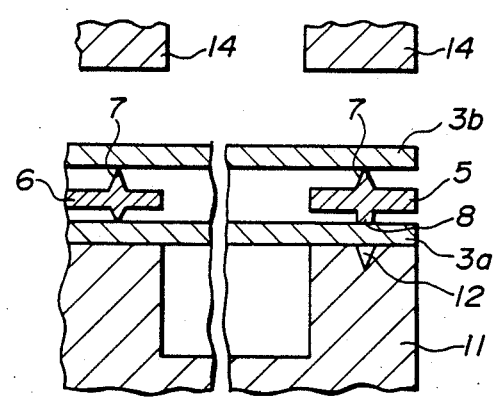
FIG. 13 is an enlarged view showing portion D of FIG. 11.

The present invention is illustrated below with reference to examples as expressed in terms of figures shown in the accompanying drawings. FIG. 1 is a plan view of the information recording disc as produced, FIG. 2 is a sectional view at A—A of the disc shown in FIG. 1, FIGS. 3 to 5 are plan views showing separate outer peripheral spacers, respectively, FIGS. 6 to 8 are plan views of separate inner peripheral spacers, respectively, FIG. 9 is a sectional view at B—B of the spacers shown in FIGS. 3 to 8, respectively, FIG. 10 and 11 are sectional views respectively showing the states relative to a disc substrate and outer peripheral spacer, and to disc substrates and outer and inner peripheral spacers, at which they are welded together, FIG. 12 is an enlarged view showing portion C of FIG. 10, and FIG. 13 is an enlarged view showing portion D shown in FIG. 11.

Figure 2:
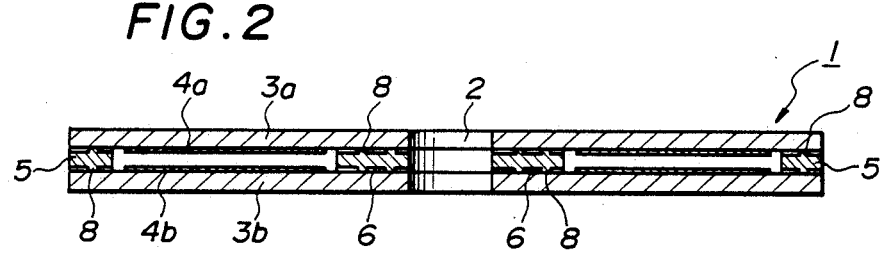
FIG. 2 is a sectional view at A—A of the disc shown in FIG. 1.

First, in FIGS. 1 and 2, 1 is an information recording disc which comprising a laminated circular disc of an air sandwich structure having a center hole 2 in the center thereof. In the disc 1, two disc substrates 3a and 3b are laminated together through an outer peripheral spacer 5 and an inner peripheral spacer 6 so that recording medium containing layers 4a and 4b of said two disc substrates 3a and 3b face to each other, said two disc substrates being welded together by ultrasonic welding at the projections 7 provided on both surfaces of said outer an inner peripheral spacers 5 and 6, respectively, and being fusion bonded to each other by means of welded portions 8 formed by transformation of said projections 7.

The outer peripheral spacer 5 is molded into the form of ring and provided with tapering projections 7 on both surfaces and in the same position thereof. The projections 7 are arranged annularly but discontinuously, and in FIG. 3 they are formed into short arcs arranged in the form of circular broken line, in FIG. 4 they are molded into long arcs arranged in the form of circle but divided into four portions along the circumference, and in FIG. 5 they are molded into the form of perfectly continuous circle.

The inner spacer 6 is molded into the form of disc having a center hole 2 at the center thereof and provided with tapering projections 7 on both surfaces and in the same position thereof. The projections 7 are arranged annularly but discontinuously, and in FIG. 6 they are molded into the form of a cone and arranged in the form of radial dots in two rows, in FIG. 7 they are formed into short arcs arranged in the form of a circular broken line, and in FIG. 8 they are molded into the form of a perfectly continuous circle.

In the process for producing the above-mentioned information recording disc 1 of the present invention, the outer peripheral spacer 5 is first set on an anvil 11 (a setting table) of an ultrasonic welding machine (not shown) by inserting the projections 7 of the outer peripheral spacer 5 into a positioning groove 12 of the anvil 11 as shown in FIGS. 10 and 12. The disc substrate 3a is then superposed on the outer peripheral spacer 5 as set above, and a positioning chuck 13 is inserted into the center hole 2 provided in the center of the disc substrate 3a, thereby positioning and holding the disc substrate 3a on the outer peripheral spacer 5. The positioning chuck 13 is so designed that it is divided into three portions which are open in the radial direction so as to position and chuck the disc substrates.

Under such conditions as illustrated above, a horn 14 connected to an ultrasonic wave oscillater is allowed to descend by the action of a fluid pressure cylinder (not shown) onto the disc substrate 3a and thereby to apply ultrasonic wave vibration thereto under pressure, whereupon the projections 7 of the upper side of the outer peripheral spacer 5 and the portions of the disc substrate 3a corresponding thereto are softened and welded to each other, thereby forming a welded portion 8 as shown in FIGS. 2 and 13.

Subsequently, the disc substrate 3a to which the outer peripheral spacer 5 has been welded is turned inside out (upside down) on the anvil 11 and thereon is superposed the other disc substrate 3b through the inner peripheral spacer 6 as shown in FIGS. 11 and 13. The resulting assembly is then positioned and held by inserting the positioning chuck 13 into the center hole 2. The horn 14 is again allowed to descend onto the assembly to apply ultrasonic wave vibration under pressure thereto, whereby unwelded projections 7 of the outer peripheral spacer 5 and the corresponding portion of the disc substrate 3b, and the projections 7 of both surfaces of the inner peripheral spacer 6 and the corresponding portions of both the disc substrates 3a and 3b soften and weld together at once to form the unwelded portions 8 as shown in FIG. 2, and thus the information recording disc 1 is obtained.

In the process as illustrated above, because the outer peripheral spacer 5 which is liable to shear in positioning is welded in the first stage of said process to the disc substrate 3a on one side, the positioning is easy and shear in positioning at the time of ultrasonic welding is inhibited. Furthermore, because all the other unwelded parts are welded together simultaneously at a state where the outer peripheral spacer 6 has been welded to the disc substrate 3a on the side, residual strain becomes less and the information recording disc 1 excellent in warpage characteristics is obtained.

The present invention is further illustrated below with reference to test examples and test comparative examples.

The information recording discs 1 were produced according to the above-mentioned process by using the disc substrates 3a and 3b, 130 mm in diameter and 1.2 mm in thickness, molded from an ethylene/tetracyclododecene copolymer (the ethylene content 62 mol %), the outer peripheral spacers 5 respectively shown in FIGS. 3 to 5, 130 mm in outside diameter, 125 mm in inside diameter, and about 0.4 mm in thickness but excluding a thickness of the projection 7, molded from a resin composition comprising an ethylene/tetracyclododecene copolymer (the ethylene content 72 mol %) incorporated with 0.3% by weight of titanium oxide, and the inner peripheral spacers 6 shown in FIGS. 6 to 8, 36 mm in outside diameter, 15 mm in inside diameter, and about 0.4 mm in thickness but excluding a thickness of the projection 7, molded from an ethylene/tetracyclododecene copolymer (the ethylene content 72 mol %). The information recording discs 1 thus produced were measured for amount of warp W (the maximum value of warp angle of the disc substrate 3a + the maximum value of warp angle of the disc substrate 3b)/2. The results obtained are shown in Table 1.

In Table 1, the amount of warp measured was expressed in terms of the following indices of evaluation. In this connection, the information recording discs which can be put to practical use without marring their performance are those having the evaluation indices F and G.

| A: | > 10 m radian |
|---|---|
| B: | 10 ≧ B > 8.75 m radian |
| C: | 8.75 ≧ C > 7.5 m radian |
| D: | 7.5 ≧ D > 6.25 m radian |
| E: | 6.25 ≧ E > 5 m radian |
| F: | 5 ≧ F > 3.75 m radian |
| G: | ≧ 3.75 m radian |

In comparative Example 1, the disc substrates 3a and 3b, the outer peripheral spacer 5 and inner peripheral spacer 6 were welded by ultrasonic welding to one another at one, and in Comparative Example 2, the disc substrate 3a and the outer peripheral spacer 5, the disc substrates 3a and 3b and the inner peripheral spacer 6, and the disc substrate 3b and the outer peripheral spacer 5 are separately welded by to each other by ultrasonic welding divided consequently in three stages. The results obtained are shown in Table 1.

TABLE 1

Figure 3:
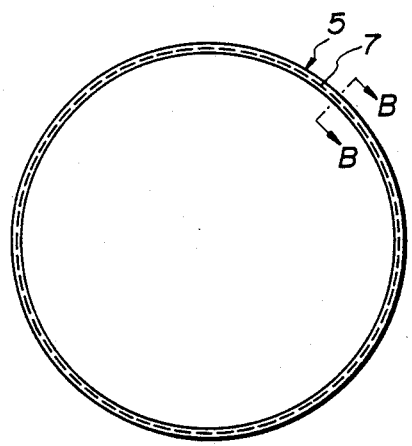
FIGS. 3 to 5 are plan views showing separate outer peripheral spacers, respectively.
Figure 4:
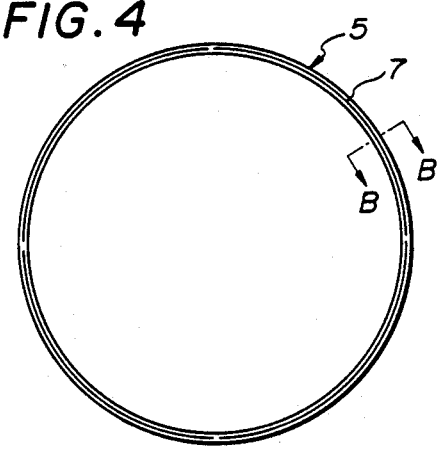
Figure 5:
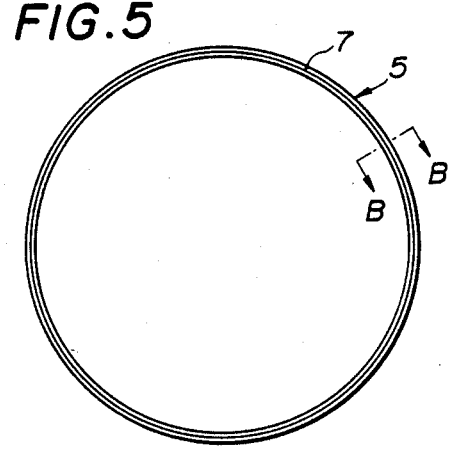

| | Welding process | Welding time (sec) | FIG. No. of outer peripheral spacer | FIG. No. of inner peripheral spacer | Amount of warp |
|---|---|---|---|---|---|
| Example | | | | | |
| 1 | 2-stage | 10 | FIG. 3 | FIG. 6 | G |
| 2 | 2-stage | 10 | FIG. 3 | FIG. 7 | G |
| 3 | 2-stage | 10 | FIG. 4 | FIG. 6 | G |
| 4 | 2-stage | 10 | FIG. 4 | FIG. 7 | F |
| 5 | 2-stage | 10 | FIG. 4 | FIG. 8 | F |
| Compar. Example | | | | | |
| 1 | 1-stage | 5 | FIG. 5 | FIG. 8 | (The outer peripheral spacer came off.) |
| 2 | 3-stage | 15 | FIG. 5 | FIG. 8 | E |

From the results shown in Table 1, it is understood that in the process of the present examples involving the two-stage ultrasonic welding, no shear in positioning of the spacers is caused and the information recording discs excellent in warpage characteristics are obtained, whereas in the process of Comparative Example 1 involving the one-stage ultrasonic welding, the outer peripheral spacer comes off and cannot be welded to the predetermined position, and in the process of Comparative Example 2 involving the three-stage ultrasonic welding, the information recording disc obtained has a large amount of warp.

What is claimed is:

1. A process for producing an information recording disc having an air sandwich structure in which first and second annular discs, at least one of which carries a recording medium containing layer, are fusion bonded to each other through outer and inner peripheral spacers lying therebetween, said process comprising:

ultrasonically welding the outer peripheral spacer to one surface of said first annular disc, superposing the inner peripheral spacer on said one surface of said first annular disc to which said outer peripheral spacer has been welded, overlying the second annular disc on said inner and outer peripheral spacers to form a partially bonded air sandwich structure, and ultrasonically welding said inner peripheral spacer to said first and second annular discs and said second annular disc to said outer peripheral spacer, thereby forming said air sandwich structure in which said first and second annular discs are bonded to each other through said inner and outer peripheral spacers lying therebetween, whereby the resistance to warping due to residual strain is improved.

2. The process of claim 1, wherein the outer and inner peripheral spacers have projections on both surfaces thereof.

3. The process of claim 2, wherein the projections are arranged annularly but discontinuously.

4. The process of claim 1, wherein said annular discs are comprised of copolymers of ethylene and one or more cycloolefins.

5. An ultrasonic welding process for producing an information recording disc of an air sandwich structure comprising a first annular disc substrate having a first inner periphery, a first outer periphery and a first annular surface bounded by said first inner and first outer peripheries, a second annular disc substrate having a second inner periphery, a second outer periphery and a second annular surface bounded by said second inner and second outer peripheries, an inner peripheral spacer and an outer peripheral spacer, at least one of said first annular surface and said second annular surface having a recording medium containing layer thereon, said process comprising:

disposing said outer peripheral spacer on said first annular surface of said first annular disc substrate proximate said first outer periphery, ultrasonically welding said outer peripheral spacer to said first annular surface proximate said first outer periphery, disposing said inner peripheral spacer on said first annular surface of said first annular disc substrate proximate said first inner periphery, superposing said second annular disc substrate over said first annular disc substrate with said inner peripheral spacer in contact with said second annular surface proximate said second inner periphery and said outer peripheral spacer in contact with said second annular surface proximate said second outer periphery, simultaneously ultrasonically welding said inner peripheral spacer to said first annular surface proximate said first inner periphery and said second annular surface proximate said second inner periphery and said outer peripheral spacer to said second annular surface proximate said second outer periphery.

6. The process as claimed in claim 5 wherein said outer and inner peripheral spacers each have a first surface and a second surface, said first and second surfaces each having one or more projections thereon, said projections on said first surfaces being contactable with and weldable to said first annular surface and said projections on said second surfaces being contactable with and weldable to said second annular surface.

7. The process as claimed in claim 6, wherein said projections on each of said surfaces are arranged annularly but discontinuously.

* * * * *